(12) United States Patent
Minarovic

(10) Patent No.: US 9,057,162 B2
(45) Date of Patent: Jun. 16, 2015

(54) MANHOLE MARKER

(71) Applicant: Joe T. Minarovic, Georgetown, TX (US)

(72) Inventor: Joe T. Minarovic, Georgetown, TX (US)

( * ) Notice: Subject to any disclaimer, the term of this patent is extended or adjusted under 35 U.S.C. 154(b) by 65 days.

(21) Appl. No.: 14/051,323

(22) Filed: Oct. 10, 2013

(65) Prior Publication Data

US 2015/0104254 A1   Apr. 16, 2015

(51) Int. Cl.
| | | |
|---|---|---|
| *E02D 29/14* | (2006.01) | |
| *E01C 23/02* | (2006.01) | |
| *E02D 29/12* | (2006.01) | |
| *E01C 23/18* | (2006.01) | |
| *G01V 15/00* | (2006.01) | |

(52) U.S. Cl.
CPC ............... *E01C 23/02* (2013.01); *E02D 29/12* (2013.01); *E02D 29/14* (2013.01); *E01C 23/18* (2013.01); *E02D 29/1409* (2013.01); *G01V 15/00* (2013.01)

(58) Field of Classification Search
CPC ......... E01C 23/02; E01C 23/18; E02D 29/12; E02D 29/14; E02D 29/1409; G01V 15/00
USPC ....................................................... 404/75, 93
See application file for complete search history.

(56) References Cited

U.S. PATENT DOCUMENTS

| | | | | |
|---|---|---|---|---|
| 5,195,841 A | * | 3/1993 | Mullins ............................ | 404/72 |
| 5,435,662 A | * | 7/1995 | Brown et al. ...................... | 404/9 |
| 6,161,985 A | * | 12/2000 | Hinkle et al. .................... | 404/26 |
| 6,695,526 B2 | | 2/2004 | Sondrup | |
| 6,945,731 B1 | * | 9/2005 | Vait ................................. | 404/10 |
| 6,997,639 B2 | | 2/2006 | Nadasde | |
| 7,777,628 B2 | | 8/2010 | Tilson, Jr. | |
| 8,375,551 B2 | * | 2/2013 | Flood et al. ..................... | 29/451 |

FOREIGN PATENT DOCUMENTS

JP        2002070054 A       3/2002

OTHER PUBLICATIONS

Hamilton County Water & Wastewater Treatment Authority, "Standard Detail and Process for Raising Manhole Frames" (2005).
Parcher, Michael J., "Wastewater Collection System Maintenance", Technomic Publishing Co., Inc., Lancaster, PA, pp. 246-247 (1997).

* cited by examiner

*Primary Examiner* — Raymond W Addie
(74) *Attorney, Agent, or Firm* — Jack V. Musgrove

(57) ABSTRACT

A portion of a street surface to be removed for access to a manhole cover is defined by placing a design mask on the street with a cutout overlying an electronic marker embedded in the street proximate the manhole. The design mask is oriented such that a larger cutout overlies the manhole cover, by aligning the design mask along an established direction. The design mask can be a template with a circular cutout, or a stencil with a ring cutout. When the marker is located proximate a curb line, the established direction may correspond to a normal from the curb line. A rectangular design mask can be oriented by keeping an edge of the design mask which is closest to a curb line parallel with the curb line. Alternatively, a compass heading may be used, and a pointer feature of the design mask can be aligned with the compass heading.

15 Claims, 4 Drawing Sheets

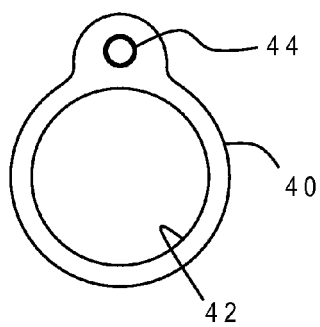
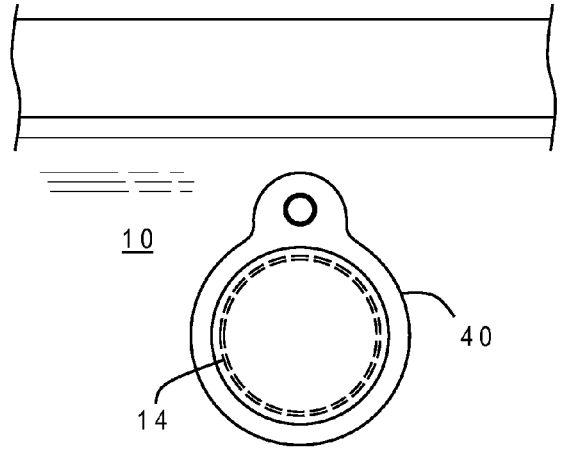
FIG. 3A
FIG. 3B
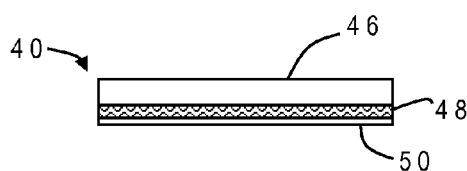
FIG. 3C
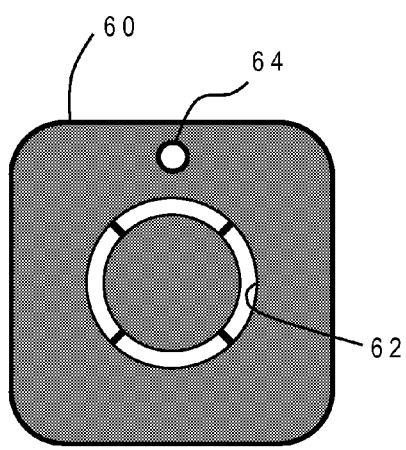
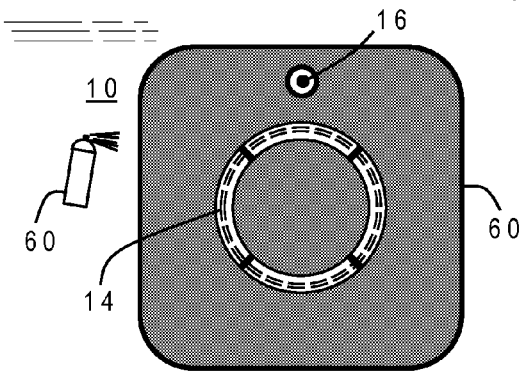
FIG. 4A
FIG. 4B

MANHOLE MARKER

BACKGROUND OF THE INVENTION

1. Field of the Invention

The present invention generally relates to devices used to mark and locate obscured objects, and more particularly to an electronic marker and template used to locate features of a buried access hatch such as a manhole or utility hole cover.

2. Description of the Related Art

Buried conduits are employed for supplying a wide variety of utilities, including pipelines for gas, water and sewage, and cables for telephone, optical fiber, power and television. It is often necessary to locate manhole covers, which are used for entrance or access to these conduits or vaults, in order to repair, modify, or replace the hatch or cover. Oftentimes when laying out a new road, a pavement crew will pave over a manhole cover with asphalt or concrete, and a different crew will come later to remove the material overlying the manhole cover so it can be raised or otherwise aligned with the street level. Conversely, it is important to know with as much accuracy as possible the approximate vicinity of such buried objects in order to avoid disturbing them when digging or excavating for other purposes. Above-ground marking devices may be installed immediately after the manhole cover is buried, but it is also common to use underground marking devices or systems to enable the later location of a utility access hatch.

In the past, different approaches have been used to indicate the presence of buried access hatches, namely, warning tape, painted symbols or surface markings, and electronic marker systems.

A warning tape is simply a band of plastic which is placed above the manhole cover before burial. These tapes are used to alert the excavation team of the presence of the manhole before any damage thereto might occur. As the backhoe or other mechanical digger excavates the site, it will hopefully uproot a portion of the warning tape prior to contact with the manhole.

Painting symbols on the ground is another common method of indicating the location of buried utility components. A worker can simply paint markings at the area above or near the buried component, and at a later time (using visual identification) pinpoint the location previously marked. Other types of visual surface markings can be used in place of painted markings, such as adhesive markers attached to the surface, or small metallic markers embedded into the ground so as to be level with the surface.

Electronic marker systems for locating buried objects are known in the art, and generally consist of two types, namely, active and passive markers (transponders). Active markers require the use of a power supply which amplifies a signal source (usually an AC signal). The signal is radiated by the underground marker and detected by a receiver unit above ground. Active markers may be "smart", that is, contain encoded data which is transmitted with the locator beacon. Passive markers, in contrast, have no power supply, but rather operate in a resonant mode, responsive to a transmitted electromagnetic field, and are usually limited to detection of a single frequency signal.

A passive marker is basically a wire coil and capacitor surrounded in a protective envelope, which is then buried adjacent to the cable, pipe, or other object to be located. The marker is self-contained, with no external, accessible connections. Passive markers are activated by radiating a signal into the ground in the area where the marker is expected to be found. The signal is emitted via an inductive coil held close to the surface (the transmitter portion of a transceiver). When the coil is directly over, or near, the passive marker (which is itself an inductive coil), the marker accepts energy within its bandpass and stores it, reaching a sustained amplitude during the transmission cycle. When the transmission cycle ends, the marker re-emits the energy at the marker's resonant frequency with an exponentially decaying amplitude. A second coil within the transceiver unit acts as a receiving antenna which detects the re-radiated energy, alerting the locating technician with an audible tone or other indicator means.

There are several kinds of passive transponders for different applications. These include small, near-surface markers for locating objects just inches below the surface, medium size or mid-range markers, full-range markers for locating more deeply buried objects, and self-aligning markers such as the so-called ball marker which supports the marker coil horizontally, regardless of the orientation of the housing. There are hybrid systems wherein, for example, a signal is applied to a buried conductor (cable or trace wire), and coupled through the conductor to one or more markers buried adjacent the conductor. Also, a marker can be used to couple one conductor to another, so that the test signal may be conveyed to the second conductor without a direct physical connection. All of these markers generally float around the underground feature in the soil, and are subject to soil movement.

SUMMARY OF THE INVENTION

The present invention is generally directed to a method and system for defining a boundary for a portion of a street surface to be removed for access to an obscured manhole cover, by determining a location of a marker embedded in the street surface proximate the manhole cover, establishing a direction of the marker relative to the manhole cover, and placing a design mask on the street surface, the design mask having at least first and second cutouts, the first cutout having a size based on a size of the manhole cover, and the second cutout being smaller than the first cutout, wherein the placing locates the second cutout over the location of the marker and orients the design mask along the direction of the marker relative to the manhole cover, and the first cutout defines the boundary for removing the portion of the street surface. In one embodiment the design mask is a template and the first cutout generally circular, and the portion of the street surface can be removed while maintaining the template on the street surface as placed. In another embodiment the design mask is a stencil and the first cutout is a ring cutout, and paint can be applied to the street surface through the ring cutout. In the illustrative implementation the marker is electronic and the marker location is determined using an electronic locating device. When the marker is located proximate a curb line, and the direction of the marker relative to the manhole cover may correspond to a normal from the curb line to the second cutout. In an embodiment wherein the design mask is generally rectangular, the design mask is oriented along the direction of the marker relative to the manhole cover by keeping an edge of the design mask which is closest to a curb line parallel with the curb line. Alternatively, a compass heading may be used for the direction of the marker relative to the manhole cover, and a pointer feature of the design mask can be aligned with the compass heading. The first cutout preferably has a size which is larger than the manhole cover by a desired tolerance amount for removing the street pavement material overlying the manhole cover. The design mask can have a laminated construction, with a structural layer, an adhesive layer applied to the structural layer, and a liner releasably adhered to the adhesive layer.

The above as well as additional objectives, features, and advantages of the present invention will become apparent in the following detailed written description.

BRIEF DESCRIPTION OF THE DRAWINGS

The present invention may be better understood, and its numerous objects, features, and advantages made apparent to those skilled in the art by referencing the accompanying drawings.

FIG. 3A is a plan view of a manhole cover indicator template in accordance with one implementation of the present invention;

FIG. 3B is a plan view of the manhole cover indicator template of FIG. 3A overlaid on the concealed manhole cover and electronic marker in the street of FIG. 1, with an orientation pointing in the direction of the street curb;

FIG. 3C is a side view of manhole cover indicator template in FIG. 3A;

FIG. 4A is a plan view of a manhole cover indicator stencil in accordance with one implementation of the present invention;

FIG. 4B is a plan view of the manhole cover indicator stencil of FIG. 4A overlaid on concealed manhole cover and electronic marker in the street of FIG. 1;

The use of the same reference symbols in different drawings indicates similar or identical items.

DESCRIPTION OF THE PREFERRED EMBODIMENT(S)

The methods above are useful for marking buried manhole covers, but have several drawbacks. The primary disadvantage of (non-metallic) warning tapes is that they cannot be detected by any surface instrumentation. One problem with above-ground marking devices is they are often lost, stolen, or destroyed after a short period of use. Electronic markers by themselves can be detected using the proper instrumentation, but they lack a visual, surface representation of the location, geometry, and orientation of the buried manhole cover.

It would, therefore, be desirable to devise an improved method of accurately marking and locating a buried manhole cover without dependency on craft skill. It would be further advantageous if the method could incorporate information about the orientation of a buried electronic marker with respect to a specific measure such as an object or direction.

Figure 1:
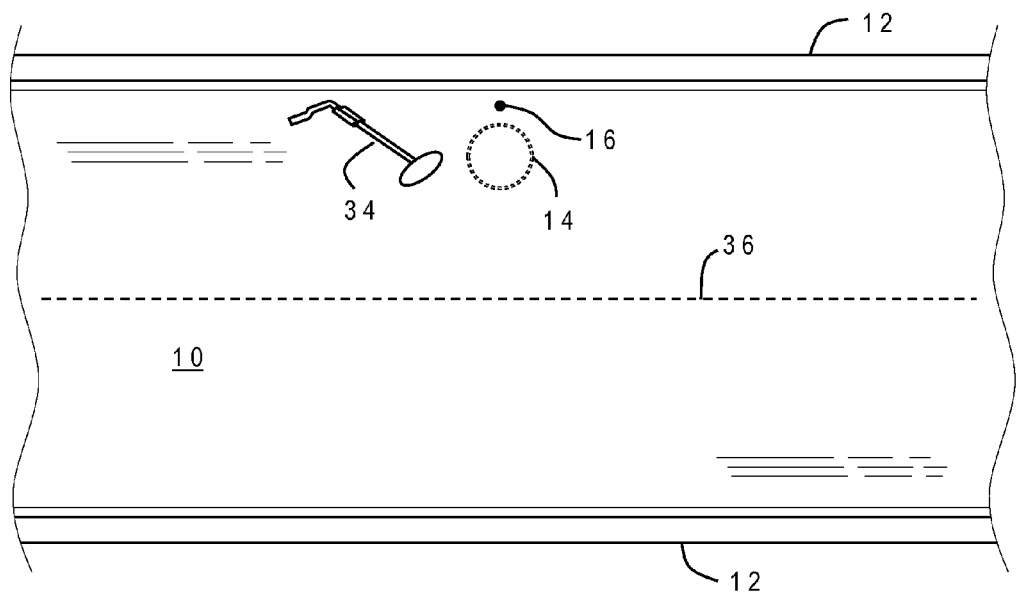
FIG. 1 is a plan view of a street layout illustrating an example of an electronic marker used to locate a nearby concealed manhole cover in accordance with one implementation of the present invention.

With reference now to the figures, and in particular with reference to FIG. 1, there is depicted one example 10 of a street running from left to right. Street 10 generally has curbs 12 on either side and a manhole cover 14 located beneath the street surface, i.e., obscured. The street may be paved with any conventional matter, e.g., asphalt or concrete. An electronic marker 16 is used to mark the location of buried manhole cover 14 in relation to an established direction, in this case, a normal (perpendicular) line to the nearest curb 12 (or closest edge of the street if the street has no curbs).

Figure 2:
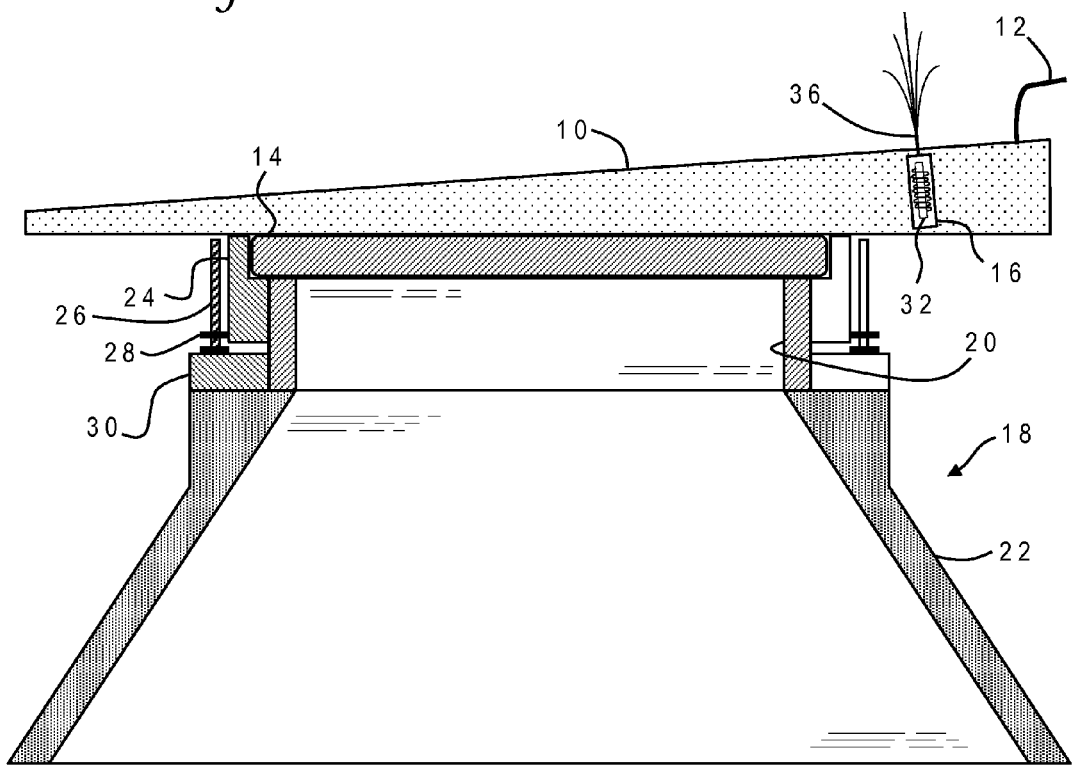
FIG. 2 is a front elevational view of the street of FIG. 1 showing a buried manhole and manhole cover.

The electronic marker can be placed on the ground prior to paving and then subsequently covered by asphalt or other material during the paving process, or the asphalt can be placed first and the electronic marker can be embedded in the asphalt such as by tapping it with a hammer while the asphalt is still soft FIG. 2 illustrates a cross-section of street 10 showing a manhole structure 18. Manhole structure 18 is generally bounded by a cylindrical wall 20 which encloses the upper interior manhole and a frusto-conical wall 22 which encloses the lower interior manhole, i.e., cylindrical wall 20 is above frusto-conical wall 22 and attached thereto or integrally formed therewith. A further cylindrical wall or other features (not shown) may comprise the lowest part of manhole structure 18. Support blocks 24 are placed around cylindrical wall 20 and together form a carriage that supports manhole cover 14. Threaded set screws 26 pass through threaded flanges 28 attached to support blocks 24, and sit atop a screw support base or collar 30. Collar 30 rests on an upper surface of frusto-conical wall 22. By rotating set screws 30, one can adjust the height and inclination of manhole cover 14. Although only two support blocks and set screws are shown, there could be more. Manhole structure 18 may have an alternative construction with different conventional features which allow the raising and/or inclination of manhole cover 14.

Buried or embedded within street 10 is electronic marker 16, placed in the vicinity of manhole cover 14. In this implementation electronic marker 16 is a passive marker and houses a ferrite-core inductor 32 which generates a specific outgoing electromagnetic signal in response to an incoming electromagnetic signal of a specific resonant frequency, such as any of the frequencies conventionally used for identifying buried utility structures (83.0 kHz for gas, 101.4 kHz for telephone, 121.6 kHz for sewage, 145.7 kHz for water, and 169.8 kHz for power); alternatively, special frequency may be designated for this purpose, particularly a higher frequency which may be used since there is very little depth requirement when the electronic marker is placed just below the surface of the street. This outgoing electromagnetic signal can be detected by an electronic locator or transceiver 34 (FIG. 1) which can in turn be used to pinpoint the exact location of electronic marker 16. Electronic marker 16 may also have upwardly extending filaments to provide a visual indication as taught in U.S. Pat. No. 7,081,820 which is hereby incorporated. If this visual indication has been removed, paint may be used to mark the location of the marker once found, e.g., a small circle of paint applied directly over the marker location on the street surface.

Once the location of electronic marker 16 has been determined, a design mask such as a template or stencil may be used to further delineate the bounds of the manhole cover, or a slightly larger geometry to allow for some desired tolerance (e.g., 2-5 inches) in the removal of the street pavement material overlying the manhole cover. FIG. 3A depicts one embodiment of a template 40 used for this purpose. Template 40 has generally circular inner and outer boundaries with the central portion 42 being cut out, corresponding to the area of the street pavement which is to be removed. Template 40 also has an extension or side portion which has a smaller circular cutout 44 adapted to be placed over the determined location of electronic marker 16. As further shown in FIG. 3B, template 40 can be placed on the surface of street 10 with cutout 44 overlying electronic marker 16. For this implementation, there is an implicit direction associated with the orientation of template 40, that is, the marker 16 was previously placed in a direct line from the center of manhole cover 14 toward the nearest curb 12 and at a predetermined distance from the center of the manhole cover which corresponds to the length between the centers of cutouts 42 and 44 (template 40 or a facsimile thereof can actually be used during the pavement process to embed the electronic marker at this spot). In this manner, when cutout 44 is centered over marker 16 with template 40 in the appropriate orientation, circular cutout 42 will define desired boundaries for removal of the street paving material to reveal manhole cover 14.

Template 40 is preferably constructed of a polymeric material such as vinyl, polyethylene or Teflon (polytetrafluoroethylene) when low surface adhesion is desired, but may be constructed of nearly any durable material including without limitation paper, paperboard, cardboard, canvas, metal or metallic alloy particularly steel or aluminum, wood, epoxy composite, or ceramic. The dimensions of template 40 may vary considerably depending upon the specific application. In many embodiments the cutout can be just slightly larger than the diameter of the particular manhole cover to allow a working kerf. For an exemplary embodiment, these approximate dimensions apply: cutout 42 has a diameter of three feet, the circular outline of template 40 has an outer diameter of three and a half feet (i.e., the circular strip portion is three inches wide), and cutout 44 has a diameter of one inch. For the polymeric embodiment, template 40 is preferably about 10 mils thick. As seen in FIG. 3C, template 40 can have a laminated construction with a structural layer 46, a layer 48 of adhesive, and a release liner 50 to keep the adhesive layer sealed until ready for use. The adhesive may be any conventional material but is preferably one that does not permanently bond to the street pavement material, including a pressure-sensitive adhesive such as acrylic resin. The street area proximate the manhole cover can be slightly cleaned with a broom or blower to remove loose material and allow the template to better adhere to the street surface.

A different design mask is illustrated in FIG. 4A in the form of a stencil 60. Stencil 60 is generally square or rectangular in shape and has a ring cutout 62 and a smaller circular cutout 64. As with template 40, stencil 60 is placed on the street surface with cutout 64 overlying electronic marker 16 and lying along a direct line from the center of ring cutout 62 toward the nearest curb as shown in FIG. 4B. This orientation can easily be achieved by keeping the closest edge of stencil 60 parallel with the curb line. Paint 66 can then be applied to the street surface through ring cutout 62 and, when stencil 60 is removed, this paint ring again defines desired boundaries for removal of the street paving material to reveal manhole cover 14. Stencil 60 may be constructed of the same materials as template 40 and have similar dimensions for the cutouts.

Figure 5:
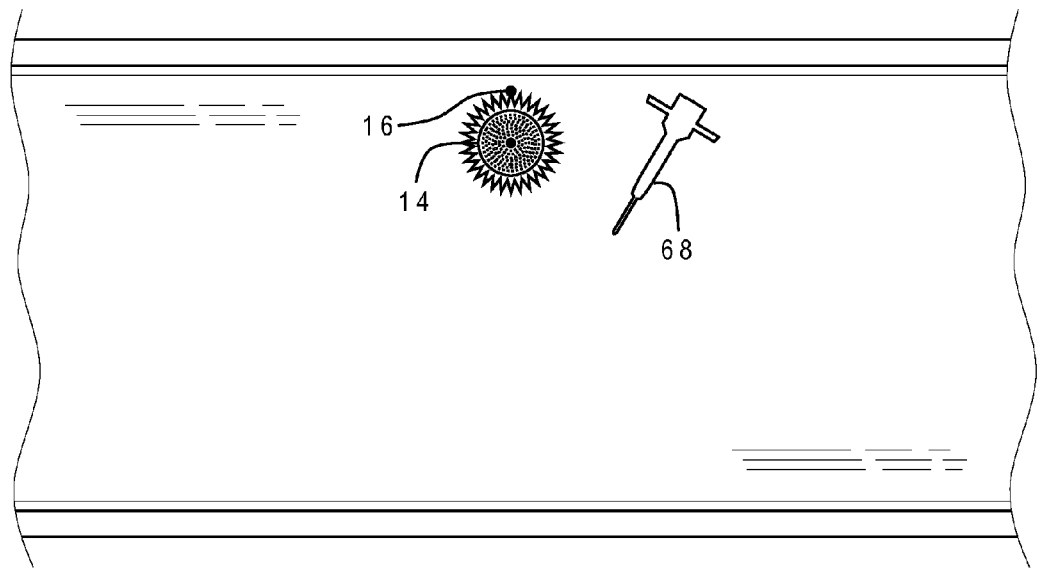
FIG. 5 is a plan view of a street layout of FIG. 1 with manhole cover exposed.
Figure 6:
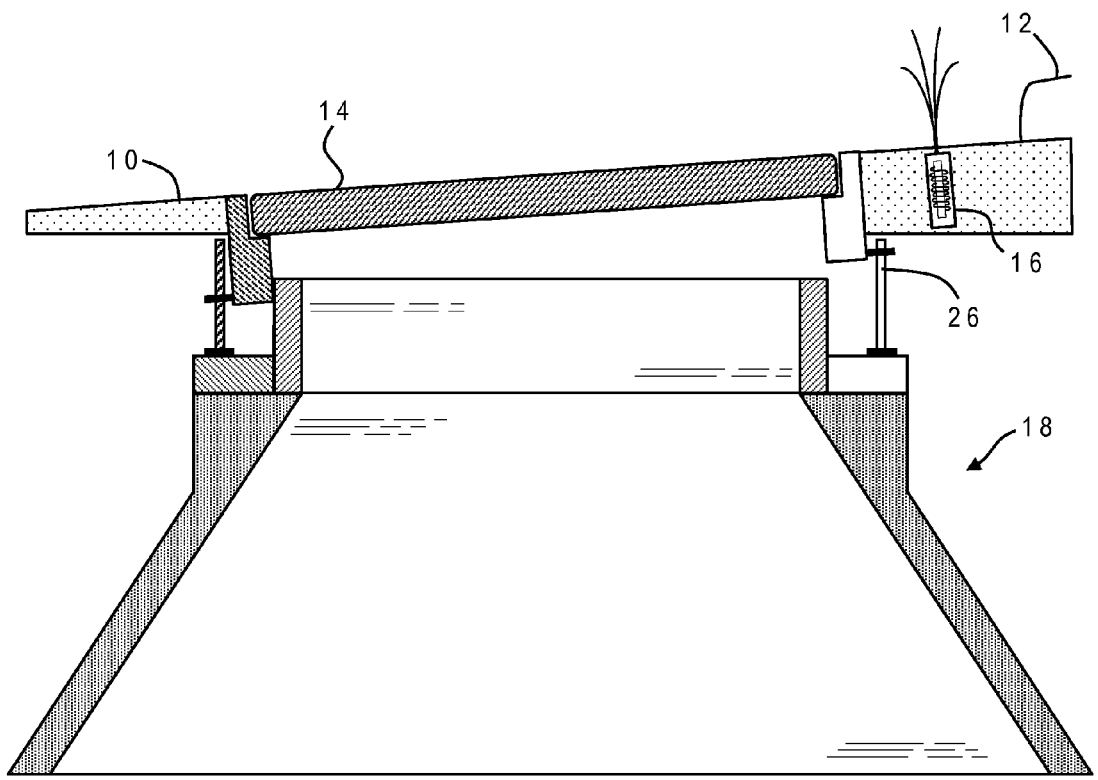
FIG. 6 is a front elevational view of the street of FIG. 1 showing an exposed manhole cover which has been raised and angled so as to be level with the street.

Once template 40 is in place or the paint ring from stencil 60 is complete, the crew can remove the street pavement material within the defined boundaries using any convenient means, such as a jackhammer 68 or saw, leaving manhole cover 14 exposed as seen in FIG. 5. Electronic marker is preferably undisturbed in case the location should become obscured again and re-location is necessary for further repair or maintenance. With manhole cover 14 revealed, manhole structure 18 can be adjusted to raise and incline manhole cover 14 via set screws 26 such that the surface of cover 14 is level with the grade of street 10 as depicted in FIG. 6.

Figure 7:
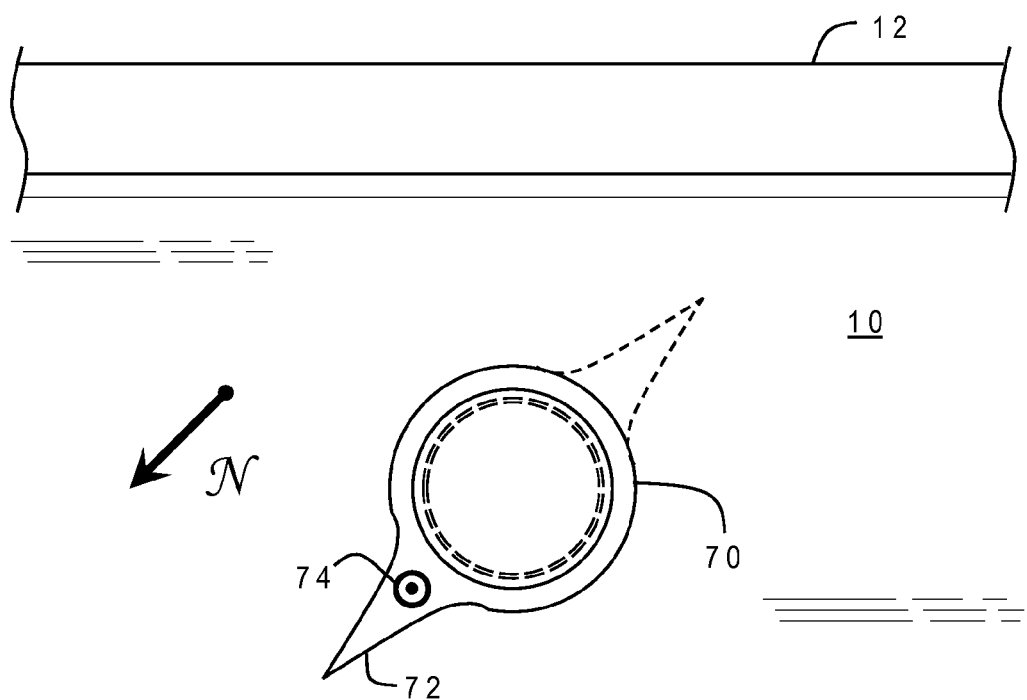
FIG. 7 is a plan view of an alternative manhole cover indicator template overlaid on a concealed manhole cover in accordance with one implementation of the present invention wherein the template includes a direction or orientation pointer, in this case aligned with a compass heading.

While the orientation of the design mask may be dependent upon an implicit direction such as the normal to the curb line or other direction based on local features near the manhole, including a longitudinal centerline 36 of the roadway (FIG. 1), the invention is not so limited and in particular can be used in conjunction with an explicit direction. FIG. 7 illustrates an alternative template 70 which is similar to template 40 except that template 70 has a construction which includes a pointer feature, such as an arrowhead portion 72. When the pavement crew originally places marker 16, they can take a compass reading to determine the relative direction of the marker with respect to the center of the manhole cover, and make a notation or record of this compass heading. In this example the marker is placed due north of the manhole cover, so the crew responsible for adjusting the manhole cover will know to place template 70 with cutout 74 overlying the marker location and with the arrowhead 72 pointing north. In the preferred embodiment of this alternative design mask, the cutout for the marker is located within the arrowhead portion but this layout is not necessary as the pointer may be at a different place than the marker cutout. For example, the arrowhead portion could be on the opposite side of the marker as indicated by the dashed lines in FIG. 7 (in which case the pavement crew would record a south heading for the orientation direction rather than north).

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. In particular, details of the construction of the disclosed embodiments need not be read as requirements for the design mask. For example, the cutouts in the template and stencil for overlying the electronic marker are described as circular, but they could be other shapes, and could even be a transparent portion of the mask rather than a cutout which would still allow the user to see a spot painted on the street surface corresponding to the marker location. It is therefore contemplated that such modifications can be made without departing from the spirit or scope of the present invention as defined in the appended claims.

What is claimed is:

1. A method of defining a boundary for a portion of a street surface to be removed for access to an obscured manhole cover, comprising:
   determining a location of a marker embedded in the street surface proximate the manhole cover;
   establishing a direction of the marker relative to the manhole cover; and
   placing a design mask on the street surface, the design mask having at least first and second cutouts, the first cutout having a size based on a size of the manhole cover, and the second cutout being smaller than the first cutout, wherein said placing locates the second cutout over the location of the marker and orients the design mask along the direction of the marker relative to the manhole cover, and the first cutout defines the boundary for removing the portion of the street surface.

2. The method of claim 1 wherein the design mask is a template and the first cutout is a generally circular cutout, and further comprising removing the portion of the street surface while maintaining the template on the street surface as placed.

3. The method of claim 1 wherein the design mask is a stencil and the first cutout is a ring cutout, and further comprising applying paint to the street surface through the ring cutout.

4. The method of claim 1 wherein the marker is electronic and said determining includes locating the electronic marker using an electronic locating device.

5. The method of claim 1 wherein the design mask is generally rectangular and said placing orients the design mask along the direction of the marker relative to the manhole cover by keeping an edge of the design mask which is closest to a curb line parallel with the curb line.

6. The method of claim 1 wherein the marker is located proximate a curb line, and the direction of the marker relative to the manhole cover is a normal from the curb line to the second cutout.

7. The method of claim 1 wherein said establishing uses a compass heading for the direction of the marker relative to the manhole cover, the design mask has a pointer feature, and said placing aligns the pointer feature along the compass heading.

8. An article for defining a boundary for a portion of a street surface to be removed for access to an obscured manhole cover, comprising:
   a design mask having a structural layer with first and second cutouts, wherein said first cutout has a size based on a size of the manhole cover, and the second cutout is smaller than the first cutout.

9. The article of claim 8 wherein the design mask is a template and the first cutout is a generally circular cutout.

10. The article of claim 8 wherein the design mask is a stencil and the first cutout is a ring cutout.

11. The article of claim 8 wherein the design mask further has a pointer feature for aligning the design mask along an established direction of a marker relative to the manhole cover.

12. The article of claim 8 wherein the design mask is generally rectangular with an edge forming a normal line with respect to a direction defined by the first and second cutouts.

13. The article of claim 8 wherein the first cutout has a size which is larger than the manhole cover by a desired tolerance amount.

14. The article of claim 8 further comprising an adhesive layer applied to said structural layer, and a liner releasably adhered to said adhesive layer.

15. A method of installing a manhole cover for a buried manhole structure, comprising:
   paving over the manhole cover to form a street surface;
   embedding an electronic marker in the street surface at a predetermined distance from a center of the manhole cover;
   recording a direction of the electronic marker relative to the manhole cover;
   after said paving, embedding and recording, determining a location of the electronic marker using an electronic locator device;
   placing a design mask on the street surface, the design mask having at least first and second cutouts and a pointer feature, the first cutout having a size based on a size of the manhole cover, the second cutout being smaller than the first cutout, and the first and second cutouts being separated by the predetermined distance, wherein said placing locates the second cutout over the location of the electronic marker and orients the design mask with the pointing feature aligned along the recorded direction;
   removing a portion of the street surface having a boundary defined by the first cutout as placed on the street surface; and
   adjusting a height and inclination of the manhole cover such that a surface of the manhole cover is level with a grade of street surface.

* * * * *